3,122,496
STRIPPER-ABSORBER METHOD AND APPARATUS
Kenneth A. Harper, Bartlesville, Okla., assignor to Phillips
Petroleum Company, a corporation of Delaware
Filed Aug. 26, 1960, Ser. No. 52,181
6 Claims. (Cl. 208—101)

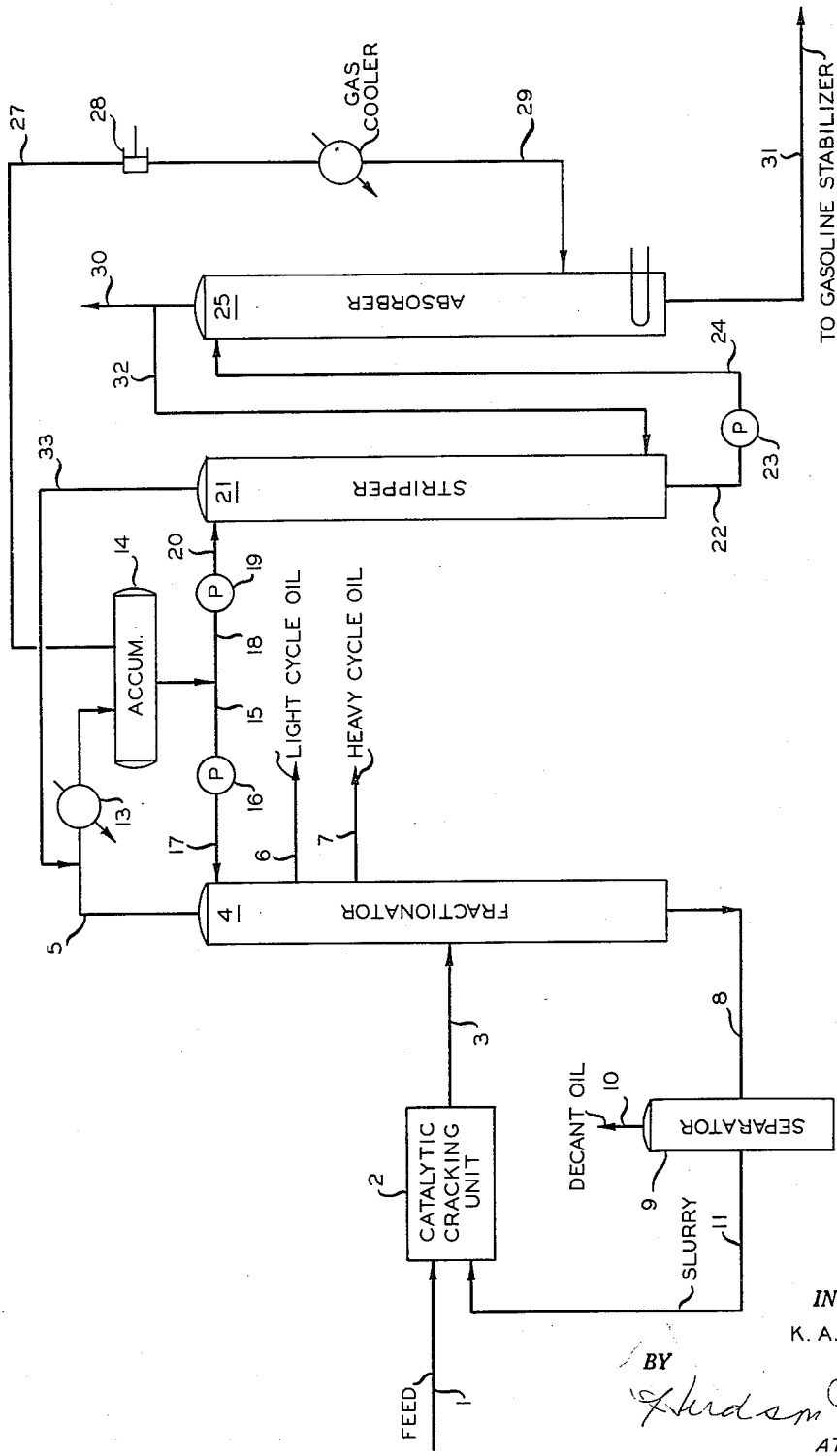

This invention relates to a stripper-absorber method. It also relates to a stripper-absorber system. In one of its aspects, the invention relates to the operation of a combination of a stripping zone and an absorption zone to obtain in said stripping zone an absorption medium for use in said absorption zone and to obtain in said absorption zone a stripping medium for use in said stripping zone, the stripping medium removing from the absorption medium produced in said stripping zone valuable vapors which otherwise would exit from the absorption zone with a lean gas product desired to be produced from said absorption zone. In a further aspect of the invention, a hydrocarbon distillation overhead containing the elements of a fuel gas and a crude gasoline which includes the elements of a stripping medium later prepared is separated into a vapor or rich gas fraction and a liquid fraction, the liquid fraction is stripped with lean gas obtained from an absorption zone thus producing an absorption medium for said absorption zone, the rich gas is passed to said absorption zone wherein valuable components of the rich gas are recovered, yielding a lean gas, while vapors recovered from the stripping zone are returned to the system for further processing into a rich gas and a liquid as just described. In another aspect of the invention, it relates to apparatus comprising, in combination, a fractionator, an accumulator, a stripper, and an absorber, piping being provided to pass overhead from the fractionator to an accumulator, to pass a rich gas from the accumulator to the absorber, to pass lean gas from the absorber to the stripper, to pass liquid from the accumulator to the stripper, and from the stripper to the absorber, and, finally, to pass vapors from the stripper to the accumulator.

In catalytic cracking operations, unstabilized gasoline is utilized as the absorption oil for the rich vapors from the fractionation zone wherein the converted hydrocarbon effluent is separated into vapors, unstabilized gasoline, cycle oil, and decant oil. Usually, some light materials in the unstabilized gasoline used as absorption oil on the rich vapors from the fractionation zone are stripped out when the rich vapors are contacted with the unstabilized gasoline and are thus lost to fuel gas. Light materials which are lost include isobutane, butylenes, etc.

I have now conceived that if I first charge unstabilized gasoline to a low pressure stripper and therein strip the same, utilizing as a stripping gas a portion of the subsequently-produced fuel gas, I can recover from the absorption oil the fractions earlier lost to fuel gas, as described. The rich gas from the low pressure stripper is returned to the fractionator-accumulator system, in one embodiment upstream of the overhead condenser. Thus, the light components are here ultimately retained in the system and recovered in the rich absorption liquid which is usually unstabilized gasoline obtained from the bottom of the usual absorption column.

It is an object of this invention to provide a stripper-absorber method. It is a further object of this invention to provide a stripper-absorber system. It is a further object of this invention to recover light hydrocarbons ordinarily lost to fuel gas when unstabilized gasoline produced in the system is used as an in situ-derived absorption oil on the rich vapors from a hydrocarbon fractionation zone. It is a still further object of the invention to avoid loss of valuable hydrocarbons to fuel gas in a combination fractionation, stripping and absorption zone.

Other aspects, objects, and the several advantages of this invention are apparent from a study of this disclosure, the drawing, and the appended claims.

According to the present invention, an in situ-derived absorption medium or oil containing components which will be stripped from said absorption medium when it is used as an absorption medium to absorb valuable vapors from a vapor-rich gas are first stripped from said stripping medium employing at least a portion of lean gas produced in said absorption zone, thus recovering or avoiding loss of valuable material to said fuel gas.

Referring now to the drawing, the invention is described in connection with an embodiment thereof which is especially adapted to the processing of vapors obtained in a fractionation zone in which a hydrocarbon conversion operation effluent is fractionated.

In the drawing, a heavy gas oil is passed by 1 to catalytic cracking unit 2 wherein a cracked conversion effluent is produced as known in the art. The effluent is passed by 3 to fractionator 4 wherein it is separated as known into an overhead 5, a light cycle oil 6, a heavy cycle oil 7 and a slurry-oil stream 8. Stream 8 is separated in separator 9 into a decant oil 10 and an oil-catalyst slurry 11 which is returned to unit 2, all as known in the art.

Overhead 5 is passed through cooler-condenser 13 into accumulator 14. Bottoms from accumulator 14 are passed by 15 and pump 16 and 17 into fractionator 4 as reflux therefor. The remaining portion of the accumulator bottoms passes by 18, pump 19 and 20 into stripper 21. Stripped bottoms are passed by 22, pump 23 and 24 into absorber 25. Vapor rich gas passes from accumulator 14 by 27, compressor 28 and by 29 into absorber 25 wherein vapors are absorbed or separated from the gas which is taken overhead from absorber 25 by 30. A gasoline product is removed from absorber 25 by 31 to storage or further treatment as known in the art. A portion of the gas in 30 is passed by 32 to stripper 21 as stripping gas which strips vapors not desired to be lost in fuel gas 30 from the liquid being stripped in 21. The stripping gas and recovered vapors are passed by 33 into 5 and treated together with the overhead from fractionator 4. It will be seen upon study of the drawing that an absorption medium is produced in situ and that the absorption medium is stripped to recover therefrom vapors which otherwise would be stripped therefrom and be lost to the gas from the absorber.

The following specific example gives the principal flows, conditions, and temperatures, as these are representative of an operation according to this invention.

*Specific Operation*

Accumulator (14):
    Pressure, p.s.i.g_____ 1.5
    Temperature, °F_____ 80
Stripper (21):
    Pressure, p.s.i.g_____ 5
    Temperature, °F_____ 75
Absorber (25):
    Pressure, p.s.i.g_____ 200
    Top temperature, °F_____ 100
    Bottom temperature, °F_____ 225

[Mol percent]

| Component | Streams | | | | | | | |
|---|---|---|---|---|---|---|---|---|
| | 27 | 20 | 22 | 32 | 30 | Fuel Gas | 31 | 33 |
| Ethane and Lighter | 37.3 | 0.7 | -------- | 94.3 | 94.3 | 94.3 | 0.2 | 51.0 |
| Propylene | 15.3 | 1.2 | -------- | 3.0 | 3.0 | 3.0 | 11.1 | 8.1 |
| Propane | 6.4 | 0.7 | -------- | 1.5 | 1.5 | 1.5 | 4.1 | 4.6 |
| Isobutane | 9.1 | 1.9 | 0.2 | 0.5 | 0.5 | 0.5 | 8.7 | 9.7 |
| Butylenes | 13.8 | 3.8 | 0.5 | 0.5 | 0.5 | 0.5 | 12.7 | 18.7 |
| Normal Butane | 2.4 | 0.8 | 0.1 | 0.2 | 0.2 | 0.2 | 1.9 | 4.0 |
| Pentanes Plus | 15.7 | 90.9 | 99.2 | -------- | -------- | -------- | 61.3 | 3.9 |
| Total | 100.0 | 100.0 | 100.0 | 100.0 | 100.0 | 100.0 | 100.0 | 100.0 |
| S.c.f./hr | 150,000 | | | 10,000 | 60,000 | 50,000 | | 20,000 |
| Bbl./hr | | 110 | 100 | | | | 175 | |

When operating without my invention, the fuel gas yield contains about 3.5 mol percent of C_4's (including butylenes) at a total flow of 51,000 s.c.f./hr. My invention saves about 30 gallons per hour of these valuable components from being wasted to fuel.

Reasonable variation and modification are possible within the scope of the foregoing disclosure, the drawing and the appended claims to the invention the essence of which is that an absorption medium produced in situ from a mixture of gases, vapors and liquid is pre-stripped employing produced lean gas which is produced by using the stripped absorption medium upon a vapor-rich gas also produced in the system, the vapors recovered in the stripping step being re-processed in the system thus avoiding loss of valuable vapors in said gas, substantially as set forth and described herein.

I claim:

1. A method for the conversion and recovery of hydrocarbons which comprises the steps of converting a hydrocarbon obtaining a conversion effluent, in a separation zone separating said effluent into at least a light fraction containing hydrocarbon vapors and a hydrocarbon fraction consisting essentially of gasoline components which are liquid under said conditions, passing said liquid to a stripping zone, passing said vapors to an absorption zone, in said absorption zone contacting said vapors with an absorption liquid to absorb therefrom hydrocarbon absorbable in said liquid, obtaining a gaseous non-absorbed hydrocarbon stream and an enriched absorption liquid, passing at least a portion of said non-absorbed hydrocarbon stream to said stripping zone as stripping medium employed therein, and in said stripping zone stripping said first-mentioned liquid with said medium, recovering from said stripping zone stripped liquid as said absorption liquid for use in said absorption zone, as described herein, and passing said stripped liquid to said absorption zone, recovering from said stripping zone vapors stripped therein from said first-mentioned liquid, passing said vapors, together with stripping medium therein, to a point in the operation ahead of said stripping zone, at a point ahead of said stripping zone separating the vapors and stripping medium into a vapor stream and a liquid stream, passing the separated vapor stream to said absorption zone and passing the separated liquid stream to said stripping zone, and removing said enriched absorption liquid as a product of the method.

2. A method which comprises in a unitary operation providing for the conversion of hydrocarbons and recovery of converted hydrocarbons by conducting the steps as follows:
   (1) Converting a hydrocarbon feedstock under conditions producing a conversion effluent;
   (2) fractionating said effluent to obtain a distillate containing hydrocarbons which are normally gaseous;
   (3) separating said distillate into a gaseous stream and a liquid stream consisting essentially of gasoline components;
   (4) passing said liquid stream to a stripping zone;
   (5) stripping said liquid in said stripping zone with a stripping gas;
   (6) passing said stripping gas and vapors stripped from said liquid in said stripping zone to a point in the operation ahead of the separation of said distillate under (3) hereof;
   (7) passing stripped liquid from said stripping zone to an absorption zone as absorption liquid therefor;
   (8) passing said gaseous stream, obtained under (3) hereof, to said absorption zone;
   (9) in said absorption zone, contacting said stripped liquid and said gaseous stream;
   (10) recovering from said absorption zone a liquid product;
   (11) recovering from said absorption zone a gaseous stream of hydrocarbons remaining unabsorbed in said stripped liquid; and
   (12) passing at least a portion of the last mentioned gaseous stream to said stripping zone and therein employing said last mentioned gaseous stream as said stripping gas, under (5) hereof.

3. In the recovery of a gasoline fraction from a hydrocarbon stream containing the same the steps which comprise:
   (1) separating said stream to obtain a stream containing a gasoline fraction and a stream containing hydrocarbon gases;
   (2) passing said stream containing a gasoline fraction to a stripping zone;
   (3) passing said stream containing hydrocarbon gases to an absorption zone;
   (4) in said stripping zone, stripping said stream containing a gasoline fraction with a gaseous stream obtained from said absorption zone as a residue gas, as herein described;
   (5) passing stripped vapors and stripping gases from said stripping zone to a part in the operation ahead of said stripping zone;
   (6) at a point ahead of said stripping zone, separating liquid from said stripped vapors and stripping gases;
   (7) passing said liquid to said stripping zone;
   (8) passing said vapors and stripping gases, remaining after liquid has been separated, to said absorption zone;
   (9) passing stripped liquid from said stripping zone to said absorption zone and employing it therein as absorption medium;
   (10) in said last zone, absorbing into the liquid, hydrocarbons which are absorbable therein, and
   (11) recovering non-absorbed hydrocarbons therefrom, and
   (12) passing at least a portion of said non-absorbed hydrocarbons to said stripping zone as residue gas used as stripping medium in said zone under (4) hereof.

4. A method which comprises fractionating a converted hydrocarbon stream containing the components of a fuel gas, a crude gasoline, and an absorption oil to obtain a distillate containing all of said components, passing said distillate to a first zone in which said distillate is separated into a rich gas fraction and a liquid fraction consisting essentially of gasoline components, passing said liquid fraction to a stripping zone wherein said liquid fraction is stripped, of hydrocarbon higher boiling than desired in said fuel gas, by contacting said liquid fraction with a portion of the fuel gas ultimately obtained, as later described in this claim, passing the thus stripped liquid fraction to an absorption zone as absorption medium therefor, passing said rich gas fraction to said absorption zone as gas feed to said absorption zone, in said absorption zone recovering in said absorption medium valuable hydrocarbons boiling higher than desired to be in said fuel gas, removing from said absorption zone a lean gas as said fuel gas, passing a portion of said fuel gas as said first-mentioned portion of fuel gas to said stripping zone, recovering vapors and gases from said stripping zone and further processing said vapors and gases.

5. An apparatus which comprises a fractionation means, a gas from liquid separation means, a stripping means, and an absorption means, means for conducting vapors into said separation means, means for removing vapors from said separation means, means for removing liquid from said separation means, means for passing vapors from said separation means to said absorption means, means for passing liquid from said separation means to said stripping means, means for passing stripped liquid from said stripping means to said absorption means as absorption medium therefor, means for recovering enriched absorption medium from said absorption means, means for removing a lean gas from said absorption means, means for passing at least a portion of said lean gas to said stripping means as stripping medium therefor, means for recovering stripped vapors from said stripping means and means for returning said vapors to said separation means.

6. In a hydrocarbon recovery system in which there is produced a distillate product containing the components of a crude gasoline and gases, in which the said gases are separated, the steps of

*a.* producing in situ an absorption oil consisting essentially of gasoline components derived from said distillate by stripping said distillate in a stripping zone under stripping conditions with a portion of a lean gas obtained herein;

*b.* passing the stripped distillate of step "*a*" as an absorption oil to an absorption zone;

*c.* passing said gases obtained in said system into said absorption zone; and

*d.* contacting said gases and said absorption oil in said absorption zone under absorption conditions to yield a lean gas which is said lean gas of step "*a*," and an enriched absorption oil which is removed as a product of the method.

References Cited in the file of this patent

UNITED STATES PATENTS

| | | |
|---|---|---|
| 2,290,957 | Hachmuth | July 28, 1942 |
| 2,564,791 | Ribble | Aug. 21, 1951 |
| 2,748,180 | Webber | May 29, 1956 |
| 2,784,806 | Ferro | Mar. 12, 1957 |
| 2,900,326 | Gilmore | Aug. 18, 1959 |
| 2,930,752 | Swerdloff | Mar. 29, 1960 |